United States Patent [19]

Brownell et al.

[11] Patent Number: 6,009,266
[45] Date of Patent: *Dec. 28, 1999

[54] METHODS, APPARATUS AND DATA STRUCTURES FOR MANAGING OBJECTS

[75] Inventors: David M. Brownell, Palo Alto; Pavani Diwanji, Mountain View, both of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/408,954

[22] Filed: Mar. 22, 1995

[51] Int. Cl.[6] .......................... G06F 9/00; G06F 15/163; G06F 9/46
[52] U.S. Cl. ............................................. 395/683
[58] Field of Search ................... 395/650, 600, 395/700, 683, 684, 496; 710/10

[56] References Cited

U.S. PATENT DOCUMENTS

| | | | |
|---|---|---|---|
| 5,201,049 | 4/1993 | Shorter | 395/406 |
| 5,247,676 | 9/1993 | Ozur et al. | 395/684 |
| 5,287,507 | 2/1994 | Hamilton et al. | 395/684 |
| 5,325,524 | 6/1994 | Black et al. | 395/600 |
| 5,504,895 | 4/1996 | Kunsava et al. | 395/650 |
| 5,511,197 | 4/1996 | Hill et al. | 395/700 |

FOREIGN PATENT DOCUMENTS 0 365 115 A2   4/1990   European Pat. Off. .

OTHER PUBLICATIONS

W. Richards Stevens, UNIX Network Programming, 1990, Prentice Hall Software Series.
A. Udaya Shankar, David Lee, Modulo–N Incarnation Numbers for Cache–based Transport Protocols, 1993 International Conference on Network Protocols, IEEE, pp. 46–54, Oct. 1993.
SOMobjects Developer Toolkit Users Guide, version 2.0, IBM, pp. 6–8 –6–10, 6–16 –6–22, 6–55 –6–61, Jun. 1993.
Khoshafian, et al., Object Identity, Sep. 1986, Special Issue of Sigplan Notices, vol. 21, No. 11.
IBM Technical Disclosure Bulletin, Efficient Mechanism for Providing Permanent Long Addresses, vol. 32, No. 4A, Sep. 1989.
J. Kaiser, Mutabor, A Coprocessor Supporting Memory Management in an Object–Oriented Architecture, Oct. 1988, IEEE Micro.

*Primary Examiner*—Alvin E. Oberley
*Assistant Examiner*—Peter Stecher
*Attorney, Agent, or Firm*—David P. Lentini; Beyer & Weaver

[57] ABSTRACT

A variety of methods, apparatus, and data structures for managing transient and persistent distributed objects are disclosed. Objects for use as object references are described, both for transient and persistent objects. In one aspect of the invention, a data structure that is intended for use as an object reference for a transient object is disclosed having a set of endpoint addresses, an incarnation number, and an object key. These elements serve to uniquely identify and locate the transient object. In another aspect of the invention, an object that is intended for use as an object reference for a persistent object is disclosed having a host computer name, a locator identification, an object key, and a subobject identifier. The first three elements serve as an indirection to the persistent object and the third element is for use by the persistent object. These data structures enable a distributed object operating environment which integrates both transient and persistent objects. A variety of methods utilizing one or more of the elements of the abovementioned object references to provide a system resource efficient interaction between a client requesting service from a server object. One particular method selects the fastest transport mode between the client and the server object. Another specific method teaches reading addressing information directly from local cache memory. If the addressing information is not available in cache memory, the information is first found and then stored in cache memory thereby perpetuating the efficiency of the invention.

26 Claims, 12 Drawing Sheets

METHODS, APPARATUS AND DATA STRUCTURES FOR MANAGING OBJECTS

BACKGROUND OF THE INVENTION

The present invention relates to the fields of distributed computing systems, client-server computing and object-oriented programming. More specifically, the present invention teaches methods, apparatus and data structures for managing transient and persistent objects.

Object oriented programming methodologies have received increasing attention over the past several years in response to the growing tendency for software developed using traditional programming methods to be delivered late and over budget. This stems from the fact that traditional programming techniques that emphasize procedural models and "linear" code tend to be difficult to design and maintain in many circumstances. Generally, large programs created using traditional methods are "brittle". That is, even small changes can effect numerous elements of the programming code. Thus, minor changes made to the software in response to user demands can require major redesign and rewriting of the entire program.

Object oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and or procedures of the object are relatively isolated from the remainder of the program. This provides code that is more easily maintained as compared to code written using traditional methods, as changes to an object's code do not affect the code in the other objects. In addition, the inherent modular nature of objects allows individual objects and interfaces to be reused in different programs. Thus, programmers can develop libraries of "tried and true" objects and interfaces that can be used over and over again in different applications. This increases software reliability while decreasing development time, as reliable programming code may be used repeatedly.

A more recent advance in the field of object oriented methodologies has been the implementation of distributed object operating environments over computers interconnected via a computer network. As used herein, the term "distributed object" or "object" refers to an encapsulated package of code and data that can be manipulated by operations through an interface. Thus, distributed objects will be see.) by those skilled in the art of object oriented programming (OOP) as including the basic properties that define traditional programming objects. However, distributed objects differ from traditional programming objects by the inclusion of two important features. First, distributed objects are multilingual. That is, the interfaces of distributed objects are defined using an interface definition language (IDL) that can be mapped to a variety of different programming languages. One such interface definition language is the Object Management Group's IDL. Second, distributed objects are location-independent, i.e., distributed objects can be located anywhere in a network. This contrasts sharply with traditional programming objects which typically exist only in a single address space which is shared with the their clients.

Distributed objects can be object clients or object servers, depending upon whether they are sending requests to other objects or replying to requests from clients. In a distributed object environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where server objects are capable of providing services to clients requesting the service. In the following discussion, the terms "object" and "distributed object" will be used interchangeably.

In the field of distributed object environments, there are potentially two predominant kinds of objects, the transient object and the persistent object. Transient objects typically have a short life span and are bound to a single host process. That is, when a host process ceases, all transient objects running under the process also cease. Thus there is no continuity of identity of a transient object from one process to another. Because transient objects are bound to a single process, they inherently cannot change their location. Hence transient objects could also be renamed "immobile" objects, as their addresses never change.

In contrast, persistent objects are not bound to a single process and their location may change over time. Thus persistent objects could be called "mobile" objects, as their addresses may change. With a persistent object, there is continuity of identity from one process to another. However, a persistent object can exist in only one process at a time.

When discussing the transient or persistent nature of an object, what is typically being envisioned is the transient or persistent nature of the object state. As will be well familiar to those skilled in the art, a computer entity such as a process or an object may have two components: executable code and state. Executable code is essentially the instructions by which the entity operates. Thus state is the remaining portion such as data which is not code. The motivation behind different kinds of state, e.g. transient and persistent, is fairly straight forward. Persistent state requires additional system resources such as mass-storage devices and corresponding management resources to ensure persistence, which may or may not be desired. For example, information stored in a database is typically intended for long term storage, and thus persistence is required. In situations such as this it is well worth the extra system resources required to maintain this data.

However, there are a variety of scenarios where persistence is not required and thus the extra system resources required for persistent state are in effect wasted. Any situation where the state is necessary only for a short period and/or if needed later can be easily recreated is a candidate for transient state. A familiar example of this is icons such as formatting and editing buttons in many window based word-processing programs. When implementing buttons such as these, there will be (roughly speaking) code which makes them operate and state which gives them their appearance. This state would include the bit map of the icon. When the word-processing window is closed, the icon disappears and there is no need to maintain the bit map of the different icons. By using transient state, the system can forget about maintaining these bit maps until they are needed again, at which time they can be recreated.

Prior solutions for dealing with transient and/or persistent state fail to provide a framework which effectively enables the integration of transient and persistent objects within a distributed object operating environment. For example, database technology, including object oriented database technology, has generally dealt only with maintaining persistent state. As another example, personal computing systems are designed so that all resources and services start up the same each time by utilizing persistent state. The well known Distributed Computing Environment (DCE) implements only persistent distributed objects, using a 128 bit identifier to manage each individual object. In general, prior technology deals mostly with persistent objects, and if it does deal with transient objects, it tends to focus on only transient objects. What is needed is a framework for efficiently integrating transient and persistent objects under a distributed object operating environment. This will require data structures which will allow for the differences between the two yet still provide an integrated framework. Moreover, effective methods for managing these persistent and transient objects will be required.

SUMMARY OF THE INVENTION

To achieve the foregoing and other objects and in accordance with the purpose of the present invention, methods, apparatus, and data structures for managing transient and persistent objects are described. In one aspect of the invention, a data structure which is intended for use as an object reference for a transient object includes a set of endpoint addresses, an incarnation number, and an object key. The set of endpoint addresses is arranged to correspond to a server most computer upon which the transient object resides. The incarnation number is arranged to correspond to a server host process which is executing on the host computer. The transient server object may run only in this server host process. The object key is an identifier which corresponds to the transient server object. These three elements, the set of endpoint addresses, the incarnation number, and the object key, serve to uniquely identify and locate the transient server object. Additionally, various embodiments and a variety of methods for utilizing one or more of these elements to enable efficient interaction between a client requesting services and the transient server object are also described.

In some applications, the length of these data elements may be variable, whereas in other applications the length may be fixed. In the fixed case, a length in the range of about 1–128 bytes is preferred. In one particular embodiment, one address from the set of endpoint addresses includes a 4 byte long server host network address and a 2 byte long server process network port number. In another particular embodiment, the incarnation number is essentially a date stamp. That is, a monotonically increasing number indicating the creation time of the server process. In other embodiments, the incarnation number is a predefined number which has a predefined meaning to the server process.

In one specific embodiment, the object key is an identification number unique within the server process that hosts the transient server object. In yet another embodiment, the object key is used to transport an object reference which is formatted according to the protocol of a different distributed object operating environment.

According to another aspect of the present invention, the data structure of the object reference includes an internal name indicating that the object kind is transient.

In another aspect of the invention, a transient object corresponding to the abovementioned object reference is contemplated. The transient object has state, but this state is strictly transient state. In further embodiments the transient object is bound to the server process and therefore has continuity of identity within and only within the server process.

In a apparatus aspect of the invention, a distributed object operating environment includes a plurality of computer systems, a computer network interconnecting the computer systems, and at least one object for use as an object reference for a transient server object. In a further apparatus embodiment, the distributed object operating environment also includes a second object for use as an object reference for a persistent server object. The second object has a data structure which includes a host computer name, a locator identification, an object key, and a subobject identifier. The second object's data structure may optionally include a location hint and a kind field which indicates that the object kind is persistent.

In the data structure of the second object, the host computer name will correspond to a host computer which has a server object locator service running on it. The locator identification will correspond to a process within which a server object locator object exists. The locator object is one component of a locator service, the locator object being consulted to establish location information for the second object. The location information will include data similar to the first object data structure such as a set of endpoint addresses and an incarnation number.

In separate aspects of the invention, various methods of managing transient and persistent objects during the calling of a distributed server object which runs on a server process residing on a server host computer are described. In one method aspect, the client has an object reference to a server object and the client call includes the steps of acquiring addressing information for the distributed server object, selecting an address for the distributed server object, and sending a request to the distributed server object. In a further embodiment this method includes the step of receiving a response from the distributed server object.

In another method aspect, the step of acquiring addressing information includes the substep of determining the kind of the distributed server object, the kinds including transient, persistent, null, and invalid. Then, depending on the kind of the distributed server object, different methods may be performed. If the kind is null or invalid, an error message is returned. If the kind is transient, then addressing information is returned directly from the object reference. If the kind is persistent, then the step of acquiring addressing information includes further steps such as determining if the addressing information is stored in cache memory on the client host computer and returning the addressing information directly from the cache memory. If the addressing information is not stored in cache memory, then the addressing information is obtained from within the distributed object operating environment, stored in cache memory, and then returned directly from the cache memory.

In a further method aspect, the step of selecting an address includes determining if said client and said server are in the same process, and if so, a local address and a local transport mode are selected. In another method aspect, if the client and server are in different processes, shared memory addressing and shared memory transport are selected if the server host computer is the same as the client host computer. However, if shared memory addressing is not available or if the server host computer is not the same as the client host computer, then remote addressing and remote transport is selected.

In a separate method aspect, a method for maintaining distributed object addressing information in a cache memory on a host computer in a distributed object operating environment is disclosed. This method begins when an object reference corresponding to a distributed object is received. Then, if the object reference includes addressing information for the distributed object, this addressing information is written into the cache memory. In some embodiments the object reference is received as part of a target object call, while in other embodiments it is received in response to a target object call. In any event, the step of receiving may include unmarshaling the object reference prior to determining if any addressing information is available.

In a method aspect related to the preceding paragraphs discussion, a multiplicity of host computers which are part of a distributed object operating environment each have their own cache memory. Each of these computers performs the method of the preceding paragraph in order to increase the addressing information available in their cache memory. Furthermore, if any of the host computers locates new addressing information, it perpetuates the advantages of the present invention by marshaling it into an object reference and distributing it to the other host computers which are part of the distributed object operating environment.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
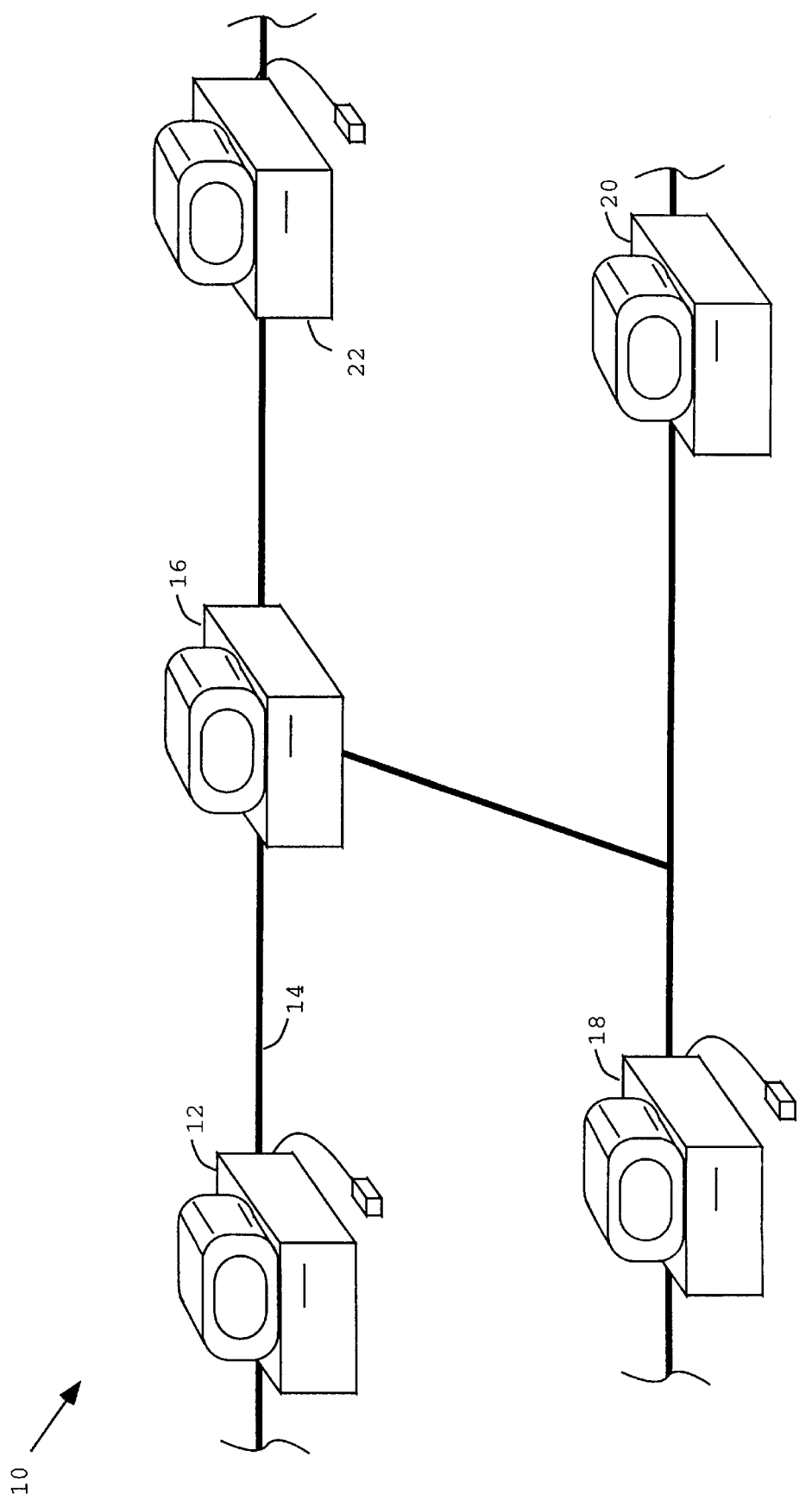
FIG. 1 is a pictorial illustration of various computers linked together in a computer network.

The present invention relates to a distributed operating environment based on object oriented programming (OOP). More specifically, this invention discloses methods, apparatus and data structures for managing objects. The kinds of objects which are discussed include transient and persistent objects. A transient object maintains no persistent state and is tied directly to the life of the process under which it is running. By way of explanation, persistent state is that state which persists (or bridges) from one process to another. On the other hand, a persistent object can have both persistent and transient state and typically persists over a length of time. In the following discussion, the different kinds of objects will be described in more detail, first through discussing example computer systems which are suitable for the present invention, next continuing with a detailed description of several embodiments of the apparatus and data structures of the present invention, and then further through the detailed description of the method aspects of the present invention.

I. Definition of Terms

As used herein, the term "distributed object" or "object" refers to an encapsulated package of code and data that can be manipulated by operations through a defined interface that is associated with an object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is OMG IDL. Second, distributed objects are location-independent, i.e., distributed objects can be located anywhere in a network. This contrasts sharply with traditional programming objects which typically exist in a single address space: the address space of the "client." Distributed objects can be object clients or object servers, depending upon whether they are sending requests to other objects or replying to requests from other objects. Requests and replies are made through an Object Request Broker (ORB) that is aware of the locations and status of the objects.

A "distributed object system" or "distributed object operating environment" refers to a system comprising distributed objects that communicate through an ORB.

An "object reference" or "objref" is data structure (it may be a traditional programming language object) that contains a pointer to another object. The creation and definition of object references will be familiar to those skilled in the art.

A "client" as defined herein refers to an entity that sends a request to an object. In this model, the object provides a service and is referred to as a "server object" or a "target object". Thus, clients invoke operations, or implementations, from servers. In some cases, clients are themselves objects. In a distributed object environment, clients need not have knowledge of the implementation programming language, nor does the implementation have to have knowledge of the client's programming language due to the requirement of multilingual character of such objects. Clients and servers in distributed object operating environments need only communicate in tern,;; of the interface definition language. As noted above, the request by the client to the server, and the server's reply to the client, is handled by the ORB. It should be pointed out that the client and server can exist within the same process, on the same host computer, or on two different host computers.

An "object interface" is a specification of the operations, attributes, and exceptions that an object provides. Preferably, object interfaces for distributed objects are written using an IDL. As noted above, objects perform transactions through their interfaces. The use of interfaces therefore eliminates the need of clients to be aware of the programming languages used to define the methods and data of the objects in the transaction.

To "marshal" a packet of information is to prepare this information for transfer either through a shared memory communications channel or over a network communications line. This often means organizing the data in a particular format in accordance with the communications protocol being used.

To "unmarshal" a packet of information is to essentially reverse the marshaling procedure and produce data in a format which is meaningful in the appropriate environment.

II. Managing Objects

The present invention relates to the fields of distributed computing systems, client-server computing and object-oriented programming. More specifically, the present invention teaches methods, apparatus and (data structures for managing transient and persistent distributed objects.

As used herein, the term "distributed object" or "object" refers to an encapsulated package of code and data that can be manipulated by operations through an interface. Additionally, the distributed object of the present invention may include features such as described in the background. For example, distributed objects can be object clients or object servers, depending upon whether they are sending requests to other objects or replying to requests from clients.

In a distributed object environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where server objects are capable of providing services to clients requesting the service. In the following discussion, the terms "object" and "distributed object" will be used interchangeably, as the following invention is directed to both types.

In a preferred embodiment of the present invention, distributed objects are located on one or more computers linked together by a network. The network may take any suitable form. By way of example a representative network arrangement 10 is illustrated in FIG. 1. The network arrangement 10 includes a first computer 12 which is coupled to a transmission line 14. The network 10 further includes a server, router or the like 16 in addition to other computers 18, 20, and 22 such that data and instructions can be passed among the networked computers. The design, construction and implementation of computer networks will be familiar to those of skill in the art.

Figure 2:
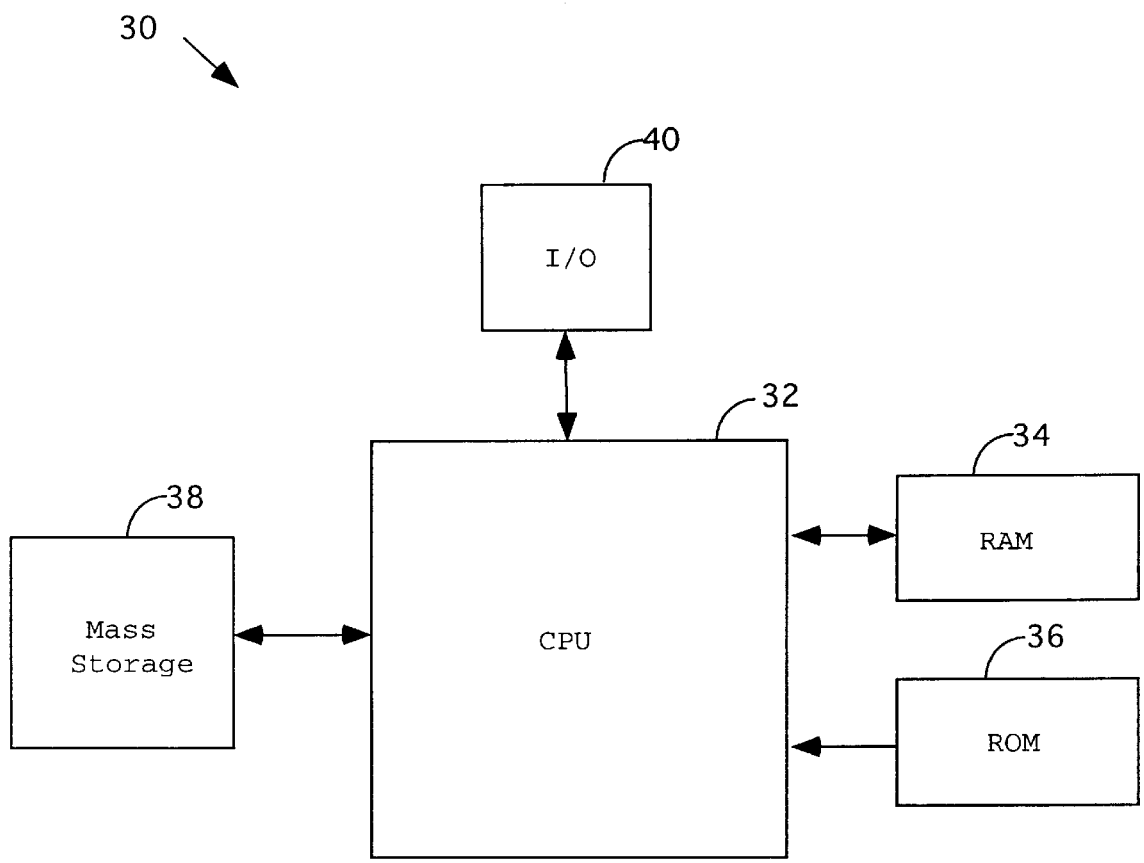
FIG. 2 illustrates diagramatically the major components of a computer in FIG. 1.

A representative computer 30 suitable for use as computers 12, 18, 20, and/or 22 of FIG. 1 is illustrated schematically in FIG. 2. Computer 30 includes a central processing unit (CPU) 32 which is coupled bidirectionally with random access memory (RAM) 34 and unidirectionally with read only memory (ROM) 36. Typically, RAM 34 is used as a "scratch pad" memory and includes programming instructions and data, including distributed objects and their associated code and state, for processes currently operating on CPU 32. Note that transient state is often stored in transient memory such as RAM 34. ROM 36 typically includes basic operating instructions, data and objects used by the computer to perform its functions. In addition, a mass storage device 38, such as a hard disk, CD ROM, magneto-optical (floptical) drive, tape drive or the like, is coupled bidirectionally with CPU 32. Mass storage device 38 generally includes additional programming instructions, data and objects that typically are not in active use by the CPU, although the address space may be accessed by the CPU, e.g., for virtual memory or the like. Note that persistent state is often stored in persistent memory such as storage device 38. Each of the above described computers optionally include input/output sources 40 that typically include input media such as a keyboard, pointer devices (e.g., a mouse or stylus) and/or network connections. Additional mass storage devices (not shown) may also be connected to CPU 32 through a network connection. It will be appreciated by those skilled in the art that the above described hardware and software elements, as well as networking devices, are of standard design and construction, and will be well familiar to those skilled in the art.

Returning to the discussion of the client and server, one of the underpinnings of distributed object environments is the interaction between the client, which is defined herein as an entity requesting a service, and a server, which is typically an object providing the service. For example, different scenarios include the client and server within the same process, in different processes on the same host computer, and on different processes running on different host computers. This client-object interaction can be discussed in terms of a client-server model. By way of example, a client may be in a process running on a network computer, such as computer 12, which requests services from a server object in a different process running on a remote computer 18.

As will be appreciated by those of skill in the art, the entities which can be a client include, but are not limited to, a process running on a host computer, hereinafter referred to as a client process and client host respectively, and an object, hereinafter referred to as a client object. Therefore, a client is an entity requesting a service, regardless of the type of entity. For the sake of clarity, the object providing the service is hereinafter referred to interchangeably as a target object or a server object. Thus in the following description, when a client invokes a target object, the client may be any entity such as a client process or a client object.

Elaborating further on the terminology of client-server interactions, a client will "call" a target object to "invoke" a "method" that is executed by the target object. Note that while "call" and "invoke" can carry slightly different meanings, herein the two terms are used interchangeably and their meanings will be understood from the context of the discussion herein. As is well known to those of skill in the art, a method is a procedure contained within an object which is made available to other entities, i.e. clients, for the purpose of requesting services of that object. Thus the object performing the service for the client is the server, hence the phrase client-server. In calling a method, the client may also pass those arguments, also referred to as parameters, necessary for the target object to perform the requested method. Please note that the previous term "method" is a term of the art of object art of object oriented programming and differs from the term "method" classically used in drafting patent applications. In the following discussion, the Applicant believes that it is made clear (either by context or by a hint from the Applicant) which meaning for the term "method" is used.

Figure 3A:
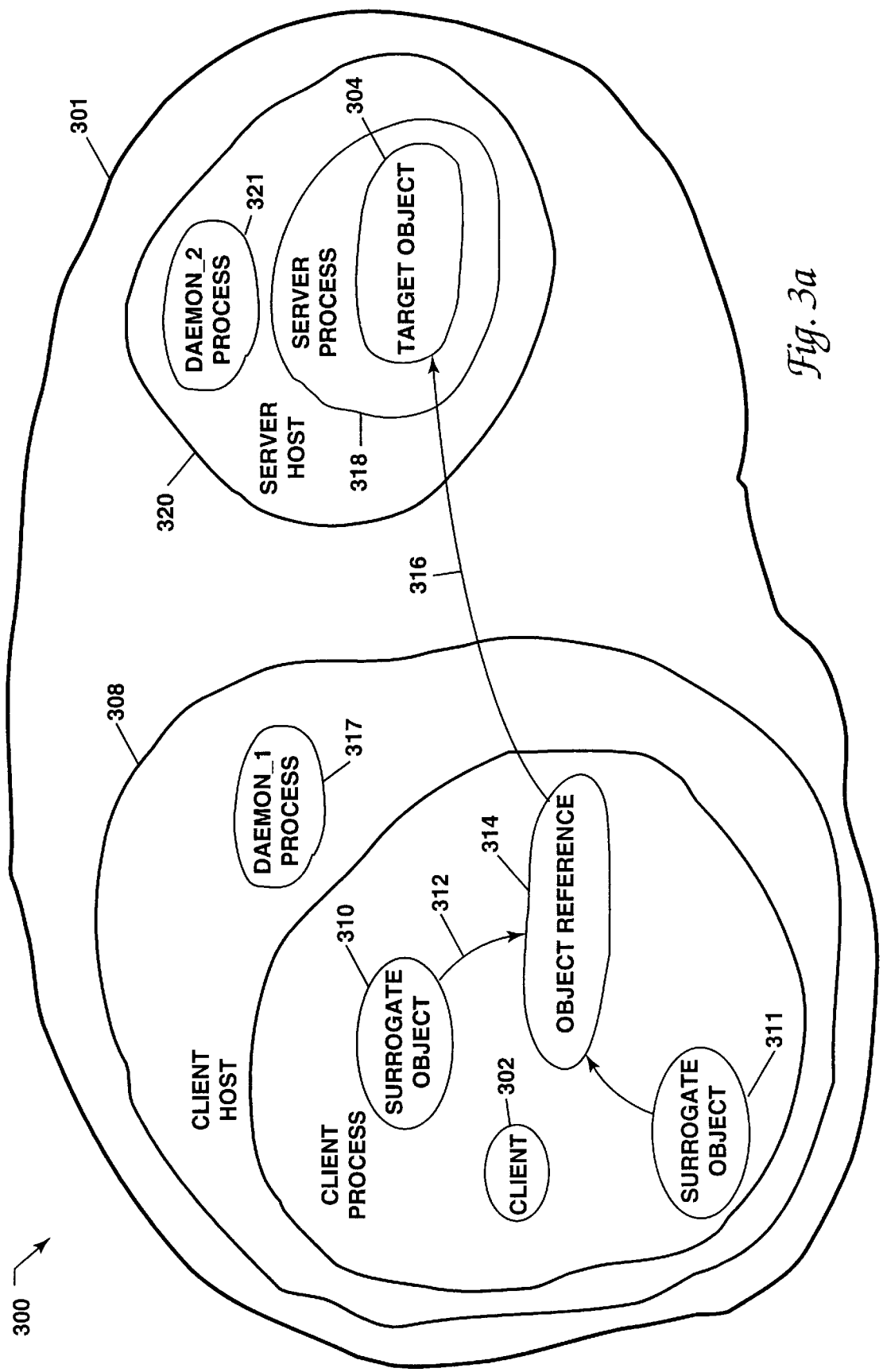
FIG. 3a is a pictorial illustration of a host-to-host client-server model showing the relationship between a client running on a client host computer and a server object running on a different, server host computer in a distributed object operating environment.
Figure 3B:
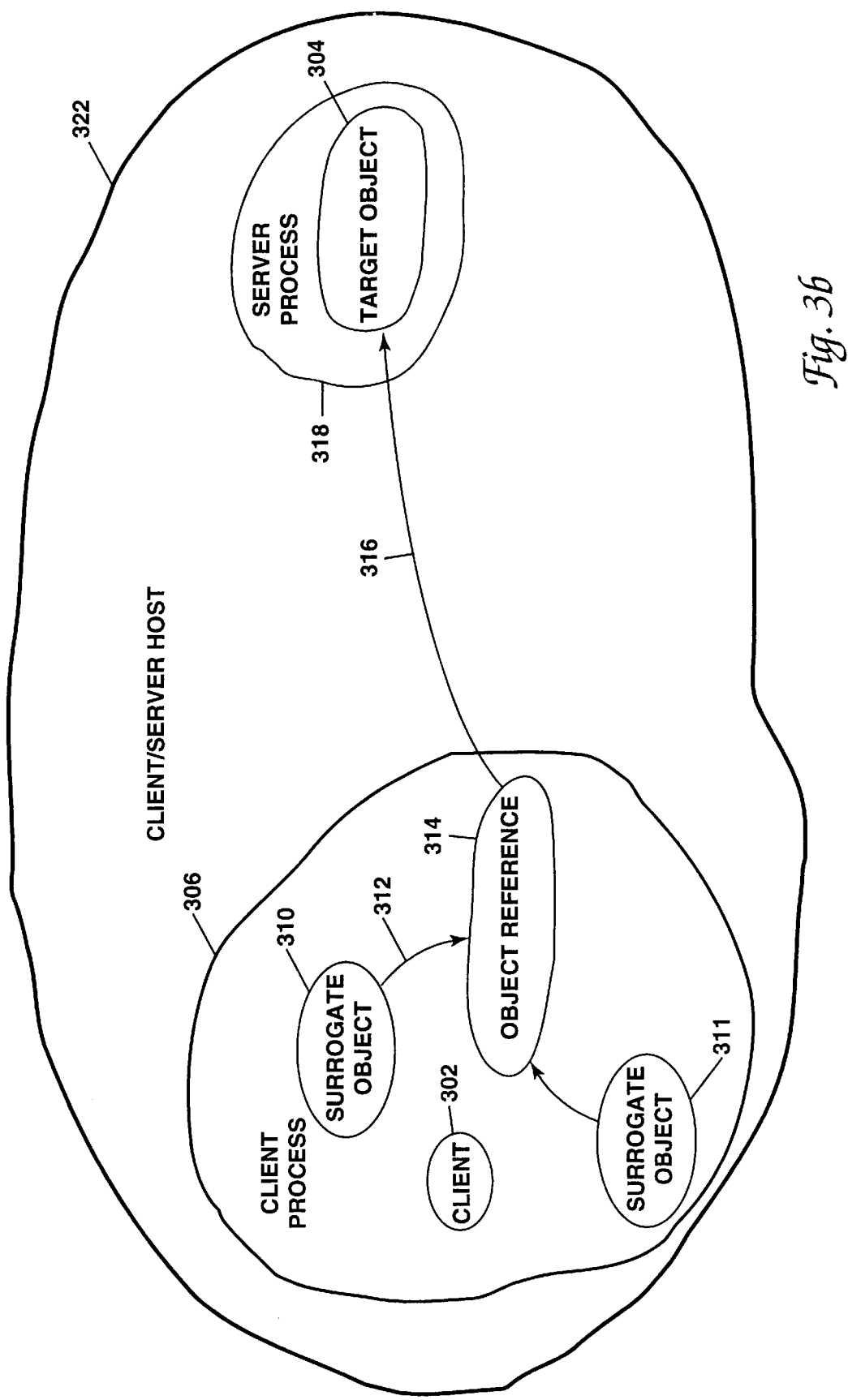
FIG. 3b is a pictorial illustration of a process-to-process client-server model showing the relationship between a client and server running in different processes on a client/server host computer.
Figure 3C:
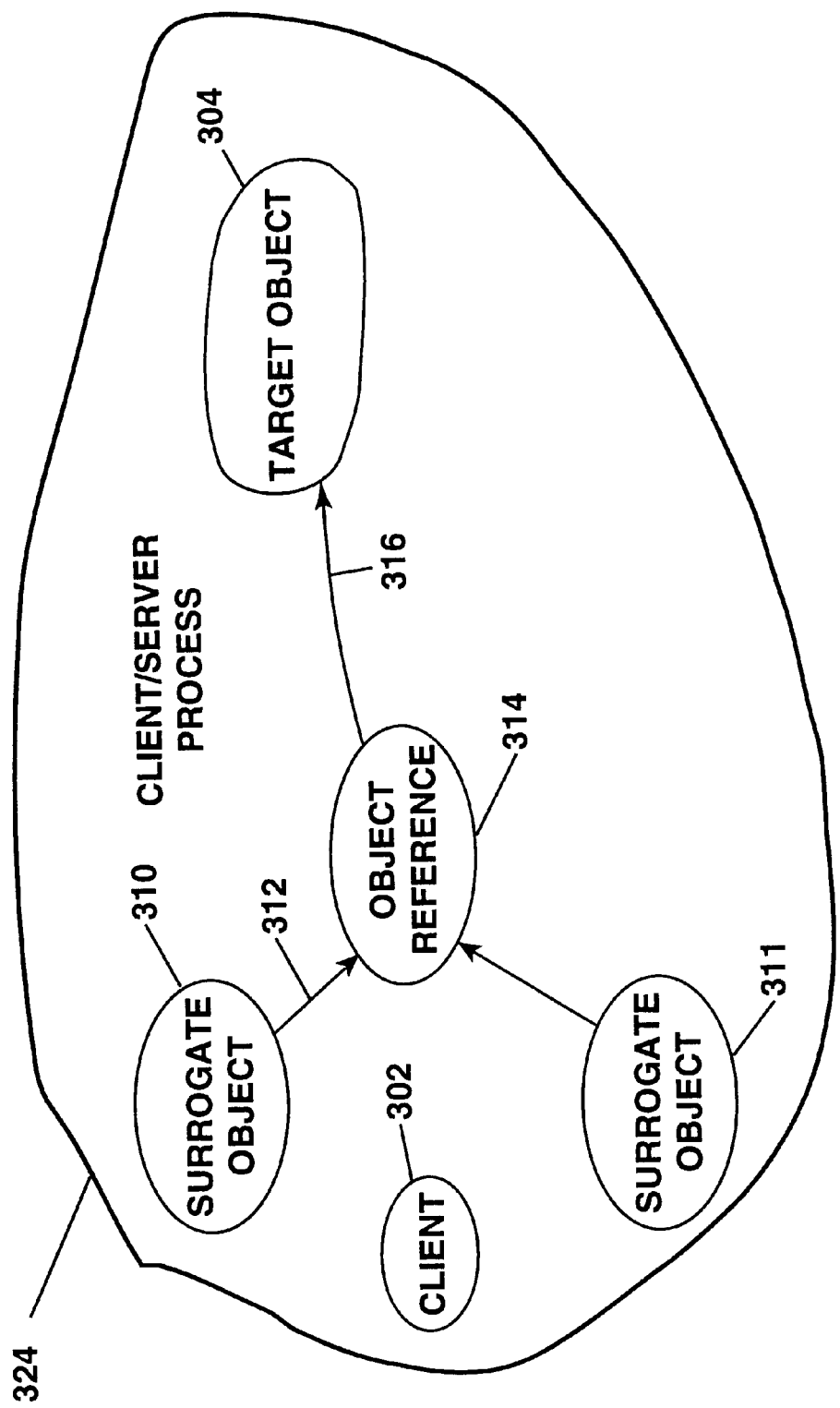
FIG. 3c is a pictorial illustration of a client-server model showing the relationship between a client and server running in a single client/server process.

Referring next to FIGS. 3a–3c, a few possible enumerations of a client-server model that are very representative of a distributed object environment will be discussed. As is always the case, the client-server model will have a client entity and a target object which is the server entity. One such arrangement for the following client-server models includes computers such as computer 30 of FIG. 2 interconnected over a network 14 as shown in FIG. 1.

Turning first to FIG. 3a, a client-server model 300 termed "host-to-host" is shown wherein client 302 and target object 304 exist on different host computers within a distributed object operating environment 301. The client 302 exists in a client process 306 which is running on a client host computer 308. Client 302 uses a first surrogate object 310 which holds (e.g. it has a first indirection 312 to) an object reference 314. In turn, object reference 314 provides a second indirection 316 to the target object 304. As used herein, an indirection to an object is simply enough information to locate the object, although perhaps not by way of direct interaction with the object. In the case of FIG. 3a, the first indirection 312 is typically just a direct pointer to the object reference, while the second indirection 316 is often more elaborate. Indirections such as indirection 316 will be discussed in more detail later with respect to FIGS. 5a and 5b. Additionally, there may be other surrogate objects present in the client process 306, such as second surrogate object 311, which may also hold the object reference 314. In some cases surrogate objects 310 and 311 may be traditional programming language objects. However some distributed object operating environments do not include surrogate objects. In these cases, the client 302 will utilize the object reference 314 without a surrogate object.

Similar to the client 302, the target object 304 of FIG. 3a can exist in a server process 318 which is running on a server host 320. Other entities may be resident on both the server host 308 and the client host 320. These include but are not limited to additional processes and/or objects running under the client process, the server process, and/or the additional processes. Two suitable processes are daemon_1 process 317 running on client host 308 and daemon_2 process 321 running on server host 320. Daemon processes typically run in the background and are well known to those skilled in the art.

As FIG. 3a illustrates, in the host-to-host case, client 302 must pass its call to the target object 304 through several "layers", i.e., complexities not directly related to the service requested of the target object. In the host-to-host example, a network connection must be established between the client 302 and the target object 304. Because of the different layers such as the client and server hosts 308 and 320 and the client and server process 306 and 318, the client-server network connection can not be established directly. Rather, the client process 306 must interpret the call, and pass this on to the surrogate object 310 which may use the ORB to first find the server host 320 and then identify the server process 318 and target object 304. Furthermore, as this data is being communicated over the network, this data must be marshaled (i.e. formatted according to the network communications protocol so as to prepare it for transmission over the network), sent, received, and finally unmarshaled. Thus, host-to-host is a complicated case of the client-server interaction. Accordingly, the additional layers and resultant steps make the host-to-host client-server interaction often the most expensive possible interaction in terms of system resource utilization.

FIG. 3b shows a "process-to-process" client-server model in which the client 302 and the target object 304 share the same host computer, a client/server host 322. However, client 302 and target object 304 reside within different processes. Similar to FIG. 3a, the client 302 exists in a client process 306 which is running on the client/server host 322. The client 302 uses a first surrogate object 310 which holds (e.g. it has a first indirection 312 to) an object reference 314. In turn, object reference 314 provides a second indirection 316 to the target object 304. Target object 304 exists within in a server process 318 which is running on the client/server host 322. Akin to the "host-to-host" case, further entities such as processes and/or objects may be resident on client/server host 322. For example, there may be other surrogate objects present in the client process 306, such as a second surrogate object 311, which may also hold the object reference 314. However some distributed object operating environments do not include surrogate objects. In these cases, the client 302 will utilize the object reference 314 without a surrogate object. In any event, the process-to-process interaction may be significantly better than the host-to-host interaction. This is, in part, because the network communication steps are unnecessary.

FIG. 3c shows a client-server model in which both client 302 and target object 304 reside within the same process, the client/server process 324. Once again, the client 302 uses a first surrogate object 310 which holds (e.g. it has a first indirection 312 to) an object reference 314. In turn, object reference 314 provides a second indirection 316 to the target object 304. In this case the second indirection 316 may just be a pointer to shared memory. This situation is perhaps the best of all three described cases. No network communications is necessary, and since both objects are under one process, they coexist in memory allocated to the client/server process 324. In the situation of FIG. 3c, other entities such as objects may be resident in client/server process 324. For example, there may be other surrogate objects present in the client process 306, such as a second surrogate object 311, which may also hold the object reference 314. However some distributed object operating environments do not include surrogate objects. In these cases, the client 302 will utilize the object reference 314 without a surrogate object.

Two other typical client-server scenarios which are not shown in the above described Figs. will now be discussed briefly. The first scenario involves the embodiments wherein the client is an object. As will be appreciated by those of skill in the art, the issues which arise are very similar (often identical) whether the client is an object or some other entity requesting service. The other scenario is one wherein the client object and the target object are the self-same object. This may occur when an object makes a recursive call upon itself. While the recursive call may appear unusual, this client-server interaction is a fairly common and powerful tool and may be dealt with in a manner similar (or perhaps identical) to the case wherein a client object and a target object are unique but exist in the same process.

Figure 4A:
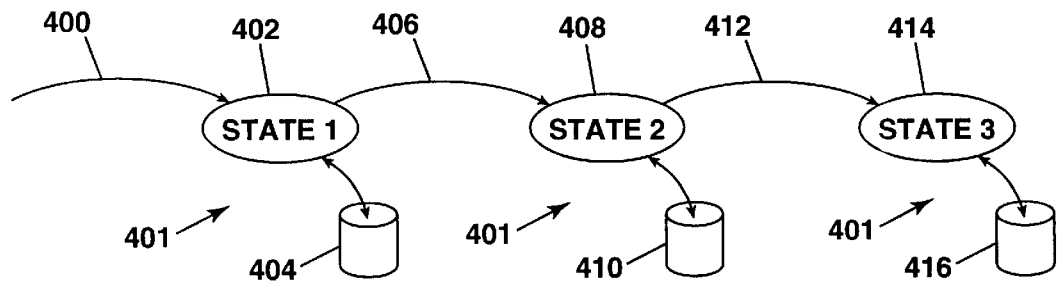
FIG. 4a is a pictorial illustration of a persistent object showing a progression through three different object states, each state including transient state and persistent state in accordance with a first aspect of the present invention.

FIG. 4a shows the progression of a persistent object 401 through three different states. The first transition 400 brings the persistent object 401 from a previous state into state 1. State 1 of object 401 includes both transient state 402 and persistent state 404. Transition 406 brings the persistent object 401 from state I into state 2. Similar to state 1, state 2 of object 401 has both transient state 408 and persistent state 410. Finally, transition 412 brings the persistent object 401 from state 2 into state 3. Once again, state 3 of object 401 has both transient state 414 and persistent state 416. For the persistent object 401, the transitions 400, 406, and 412 can be any operation which changes the state of the object 401, including the termination of a process under which the object exists. Because the persistent object includes persistent state at each stage, it has the capacity to bridge from process to process and maintain itself for long periods of time.

Figure 4B:
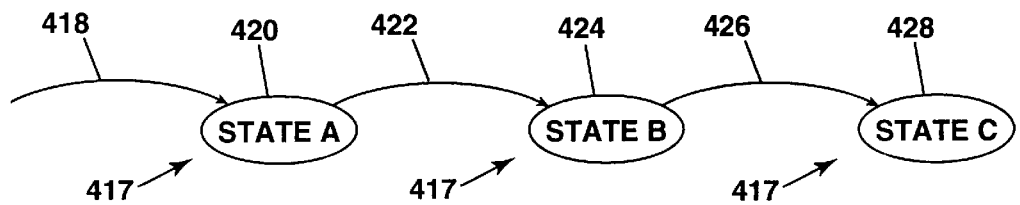
FIG. 4b is a pictorial illustration of a transient object in accordance with a second embodiment of the present invention showing a progression through three different states, each state including transient state in acccordance with a second aspect of the present invention.

In contrast, FIG. 4b show the progression of a transient object 417 through three different states. The first transition 418 brings the transient object 417 from a previous state into a state A. State A of transient object 417 includes transient state 420 but does not include any persistent state. Transition 422 brings the transient object 417 from state A into a state B. Similar to state A, state B of transient object 417 has transient state 424 and does not have any persistent state. Finally, transition 426 brings the transient object 417 from state B into a state C. Once again, state C of transient object 417 has transient state 428 and does not have any persistent state. For the transient object 417, the transitions 418, 422, 426 can be any operation which changes the state of the transient object 417, with the exception of operations which include cessation of the process under which the transient object 417 exists. Because the transient object 417 does not include persistent memory, it cannot bridge across processes. Therefore transient objects exist in one and only one process and cease to exist when the process ceases. Additionally, note that a process location and address cannot change, therefore a transient object's location and address cannot change.

From the above discussion of the client-server model and the relationship to transient and persistent objects, it should be apparent that frameworks for handling client-server interactions efficiently and flexibly are preferred. One framework which provides apparatus and data structures will now be discussed.

In order to facilitate the aforementioned client-server interactions, distributed object operating systems (including the distributed architecture specified by CORBA) typically incorporate an object termed an "object reference." Object references serve both to locate and to identify the target objects of individual operation requests, as well as to provide general parameters of operation. Because of the differences in dealing with the different kinds of objects, there are no teachings in the prior art which incorporate both transient and persistent objects under the same framework. However, the teaching of the present invention includes a framework for use within a distributed object operating environment which integrates both transient and persistent objects. One embodiment incorporating transient object references and persistent object references will be discussed later in more detail.

As object references direct a client to their corresponding target object, there is another meaningful way of looking at the adjectives "transient" and "persistent" as used to modify the term "object reference." Persistent object references are an indirection (they locate and identify) to a distributed object which has continuity of identity. Therefore, the indirection of a persistent object reference is a persistent indirection as it is always valid (unless the identity of the persistent object is destroyed). In contrast, transient object references are a direction to a distributed object which has no continuity of identity. Therefore, the direction of a transient object reference is a transient direction.

In addition to transient and persistent object references there are two additional kinds of object references which should be mentioned. The first is a "null" object reference and the second is an "invalid" object reference. Similar to transient and persistent object references, null object references and invalid object references correspond to null and invalid objects. A null object may be an object which does not have an interface, or is in a state in which it will not serve clients. In preferred embodiments the null object reference is supported and therefore may be coded. An invalid object is typically a nonexistent or ill-formed object and is usually not supported. Therefore a invalid object may typically not be coded.

Figure 5A:
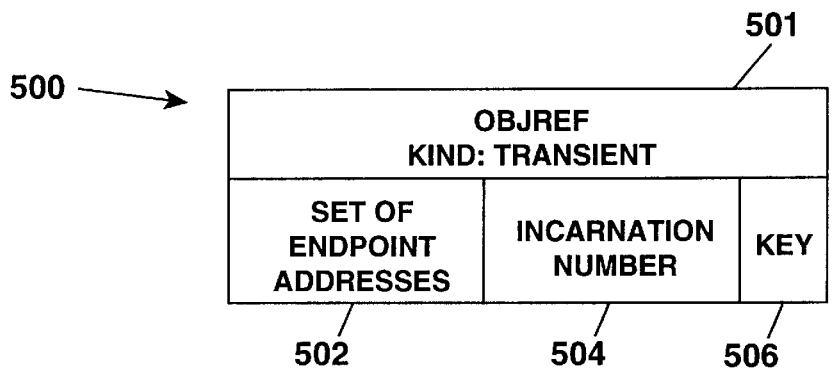
FIG. 5a is a pictorial illustration of an object reference for a transient object, the object reference including a kind field, a set of endpoint addresses, an incarnation number, and an object key in accordance with a second embodiment of the present invention.

FIG. 5a shows a pictorial illustration of a data structure for a transient object reference 500 in accordance with one embodiment of the present invention. The object reference 500 includes an kind field 501, a set of endpoint addresses 502, an incarnation number 504, and an object key 506. In preferred embodiments, kind field 501 is a data element which represents the object kind to which object reference 500 indirects. In other embodiments, the kind field 501 is not included in the object reference 500 and the object kind is determined by the distinguishing features of the data structure of the object reference 500. That is, the object kind to which an object reference indirects can be determined uniquely by the data structure of the object reference.

Continuing the discussion of FIG. 5a, the set of endpoint addresses 502 includes addressing information necessary for a client to locate the server host and server process in which the target object may exist. This information may include elements such as the server host network address, the server process network port number, and/or the memory location of the target object. Furthermore, the set of endpoint addresses may include a plurality of addresses, each of which may be valid. The set of endpoint addresses may include a variable or a fixed length data element. Suitable lengths for a fixed length data element are in the range of about 1–128 bytes, while lengths in the range of about 24–96 bytes are preferred, with a length of about 64 bytes being more preferred. By way of example, if the network protocol is the well known transmission control protocol/Internet protocol (TCP/IP), then one address in the set of addressing information 502 may include a six byte data element wherein the first four bytes are the TCP/IP server host network address, in network order, and the other two bytes are the TCP/IP server process network port number, also in network order.

Another element of the object reference 500 of FIG. 5a, the incarnation number 504, is an identifier which prevents misdelivery of ORB requests to the wrong destination in the event of address reuse. In other words, even with the set of addressing information, which pinpoints the server host address and the server process identification, it still is possible that the server process is not uniquely identified. As discussed below, the incarnation number of the present invention overcomes potential ORB misdeliveries.

While a misdelivery may seem impossible at first glance, one must carefully consider how transient objects and their host server processes are managed. Transient objects do not exist from process to process, but rather cease when their server process ceases. But, as those of skill in the art will understand, a running computer creates and deletes computer processes constantly, each of these processes having a specific network address. Therefore it is certain that one process may cease, thereby ceasing all the unique transient objects which exist within it and also freeing up a network address. This network address may be reused as there are typically only a finite quantity of process network addresses available (32,768 or 32 K is a typical number). Thus a request for a transient object which has ceased may be misdirected by the ORB if some other distinguishing identification is not provided.

As the ORB is responsible for interpreting the incarnation number 504, the ORB, and more specifically the object adapter (OA), is typically responsible for the assigning of the incarnation number 504. This number can be arbitrart as long as it is distinguishable by the ORB. Various embodiments of the incarnation number 504 are contemplated. For example, assigning the incarnation number 504 some monotonically increasing value, such as a timestamp, allows the ORB to distinguish between different processes which exist inconcurrently but happen to receive the same address. In other cases, it may be desirable to have two or more processes which are indistinguishable. In this case, identical incarnation numbers could intentionally be assigned. Still further situations may arise when it is desirable to have a predetermined number such as zero be assigned to the incarnation number 504. In any event, the incarnation number 504 may include a data element of fixed or variable length, depending upon the predetermined protocol. Suitable lengths for a fixed length data element are in the range of about 1–16 bytes, with lengths in the range of about 2–6 bytes being preferred and a length of about 4 bytes being more preferred.

As will be appreciated by those skilled in the art, the incarnation number, either as described in the above embodiment or in other embodiments, enables a distributed object operating environment to flawlessly distinguish transient objects. The incarnation number is novel to the present invention and allows the use of persistent and transient objects within a distributed object environment.

The last listed element of the transient object reference 500 of FIG. 5a is the object key 506. In one embodiment object key 506 serves to distinguish between objects within the server process. Depending upon the predetermined protocol, the object key 506 may include a data element of fixed or variable length. Suitable lengths for a fixed length data element are in the range of about 1–16 bytes, with lengths in the range of about 4–8 bytes being preferred and a length of about 6 bytes being more preferred.

Figure 5B:
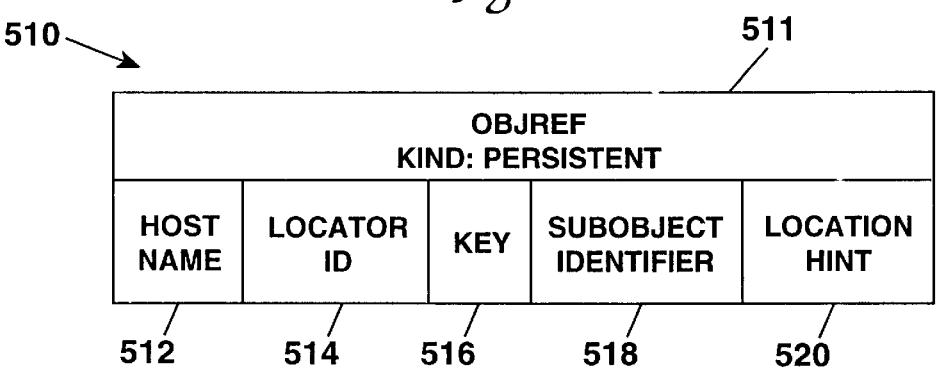
FIG. 5b is a pictorial illustration of an object reference for a persistent object, the object reference including a kind field, a host name, a locator identification, an object key, a subobject identifier, and a location hint in accordance with a first embodiment of the present invention.

FIG. 5b shows a pictorial illustration of a persistent object reference 510 according to one embodiment of the present invention. The persistent object reference 510 is an object which points to a persistent server object, and includes a kind field 511, a host name 512, a locator identification number (locator id) 514, an object key 516, and a sub-object identifier 518. As shown, the persistent object reference may also include an optional location hint 520. As discussed above with respect to FIG. 5a, kind field 511 is a data element which represents the object kind to which object reference 510 indirects. The host name 512 indicates a host computer which has a locator service (which is an entity such as a locator process or a locator object) responsible for maintaining the locations of target objects. For example, the host name 512 may include a network address. In preferred embodiments the host computer indicated by host name 512 has the target object resident therein.

Referring next to the third listed element of the persistent object reference 510 of FIG. 5b, the locator id 514 uniquely identifies the locator service on the host which is defined by the host name. In one embodiment the locator id includes a fixed length data element. By way of example, one suitable embodiment of the locator id 514 is a remote procedure call (RPC) program number for the locator. Those of skill in the art will be familiar with RPC protocols and the generation of RPC program numbers. In general, the RPC service will maintain a correspondence between a constant RPC program number and the desired server process addressing information. That is, the RPC service is updated whenever the server process addressing information is changed. Thus the distributed object system need not update the persistent object reference. In this case, the locator id 514 may be a fixed length data element with a length of 4 bytes. Turning next to the fourth element of FIG. 5b, in one embodiment object key 516 uniquely defines the target object with respect to the locator. Hence the locator uses the object key 516 to determine which desired target object is being requested.

The combined data elements 512–516 constitute one example of what is known in the art as an "indirection." An "indirection" is a set of information, a pointer, etc., which directs the client entity to a source (such as a locator object) which can direct the client entity to the object. By way of a descriptive analogy, if a client requested geographical directions, an indirection would point the client to the location of a current map, or perhaps provide the client with a phone number of a geographically astute individual. The idea of using an indirection (rather than direct addressing) is useful for persistent objects as these are mobile both from process to process and host computer to host computer With continued reference to FIG. 5b, the sub-object identifier 518 is a data element typically used only by the target object to manage finer grained objects. By way of analogy, a spread sheet may be an object, with the cells of the spread sheet being sub-objects. The granularity of objects, sub-objects and methods and apparatus for managing sub-objects are described in more detail in copending U.S. patent application Ser. No. (Attorney Docket No. P/717SUN1P023) entitled "METHODS AND APPARATUS FOR MANAGING COLLECTIONS OF OBJECTS", by Vanderbilt et. al., which is incorporated herein by reference in its entirety. Another element optionally included in the persistent object reference 510 is the location hint 520. The location hint 520 is an optional data element which provides details regarding the last known location of the target object. The location hint 520 may also include an expiration timestamp. By way of explanation, the target object may have been called previously, thus the addressing information for the target object was retrieved at an earlier time. By using this location hint 520, the distributed operating system can avoid making the call to the locator. Of course, if the location hint 520 has expired or is not present, then the locator must be queried anyway.

The embodiment of the present invention described above with respect to FIGS. 5a and 5b serves to wholly integrate the different kinds of object references into one distributed operating environment framework. As described, the distributed object environment can distinguish between the two primary kinds of object references and still maintain the advantages accorded to each kind.

Further integration occurs by utilization of the data elements provided by the present invention. For example, the object key in both transient and persistent object references may be used for transporting an object reference formatted according to a first protocol of a first distributed system into a second distributed system utilizing a second protocol. This may be done by formatting a second object reference according to the second protocol and storing this in a variable length object key of the first object reference. Upon receiving the object reference, the second distributed system can strip out the object key and generate an object reference for the target object which is in the proper format for the second distributed system. Thus both transient and persistent object references can transfer across protocols by an identical mechanism—the object key.

Still further evidence of the wholly integrated framework which the present invention provides can be found in considering the location hint of the persistent object reference data structure. As will be apparent, a suitable embodiment for the location hint may include a set of addressing information, an incarnation number, and an expiration date. In the case where the location hint is available, current, and valid, the persistent object reference indirects to its persistent object by the exact same mechanism that a transient object reference directs to its transient object. Not only is this combination effective for integrating the two kinds of object references, it lays the framework for a novel and cost effective method (with respect to system resource utilization) for calling persistent target objects, which method is: making calls to persistent distributed objects directly rather than through the use of a locator.

While the disclosed embodiments of transient and persistent object references provide a few preferred frameworks for implementing the data structure aspect of the present invention, there are many other suitable embodiments. For example, in some embodiments the distributed operating system may update each and every object reference when a persistent object moves its location. Thus both persistent and transient object references may have direct addressing information, rather than the indirection described in the embodiment of the persistent object reference 510 of FIG. 5b. In a further example, some embodiments may eliminate direct addressing completely, depending only on an indirection. In this case, the transient object reference may appear in a form akin to the persistent object reference 510. Still further embodiments would incorporate features required by specific network communications protocols to enable operation under their particular framework.

As will be apparent from the foregoing discussion, a distributed operating system which utilizes the aforementioned structures for objects, which include transient and persistent objects, and transient and persistent object references, will have many advantages over the prior art. These advantages will be made clearer in the following discussion of client-server interactions which utilize method aspects of the present invention.

Figure 6:
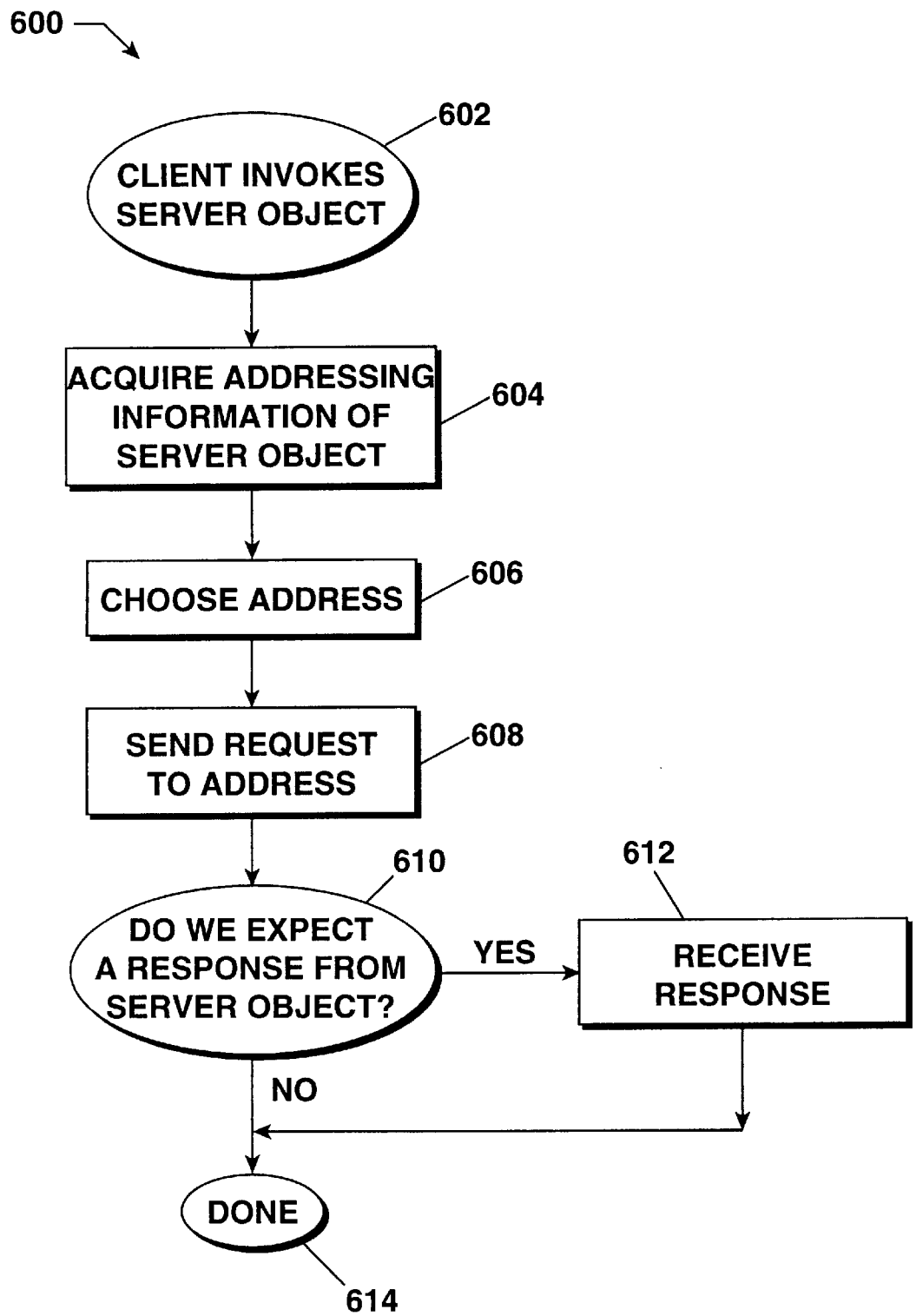
FIG. 6 is a flow chart illustrating a process executed by a client to invoke a distributed server object in accordance with one method aspect of the present invention.

Turning now to FIG. 6, a method 600 for implementing the client-server interaction in accordance with one embodiment of the present invention will be described. The client-server interaction begins in a step 602 when the client invokes the server object (also referred to as the target object). The client may be any suitable entity such as a client process or a client object. In a next step 604, the client acquires addressing information regarding the server object. For example, the addressing information acquired may include data such as described in the previous discussion of transient and persistent object references. It should be appreciated that this addressing information may include a plurality of addresses from which one specific address is chosen. One criterion for choosing the address is to enable the fastest mode of transport between the client and the server. Another common criterion for choosing the address is security. Also, acquiring this addressing information may include various steps due to the fact that the information may be located at different sources.

Once the addressing information is acquired in step 604, the client, in a step 606, evaluates the addressing information to choose a specific address. In step 606 the client may select an address based on different rationale, including goals such as transport speed between client and server, load sharing, security, and/or concerns regarding the integrity of the addressing information. A more detailed illustration of one embodiment of the substeps of step 606 is discussed below with reference to FIG. 8.

Continuing on through method 600 of FIG. 6, the client, in a step 608, sends the request to the address chosen in step 606. If the address is a remote address, step 608 may include the steps of marshaling the chosen address together with the method and arguments, establishing a network connection with the remote target object, and then making a remote call to the target object. As used herein, to "marshal" data is to format the data in accordance with a predetermined network communication protocol in preparation for network transmittal. In a step 610, it is determined if the client expects a response, and, if so, process control is passed to a step 612 wherein the client receives the response from the target object. Similar to step 608, if the target object is remote, then the client may "unmarshal" the response from target object, i.e., the data is translated from a predetermined network communication protocol into a format meaningful to the client. After receiving the response, or if no response is expected, control proceeds to a step 614 upon which the client-server interaction of FIG. 6 is complete.

Figure 7:
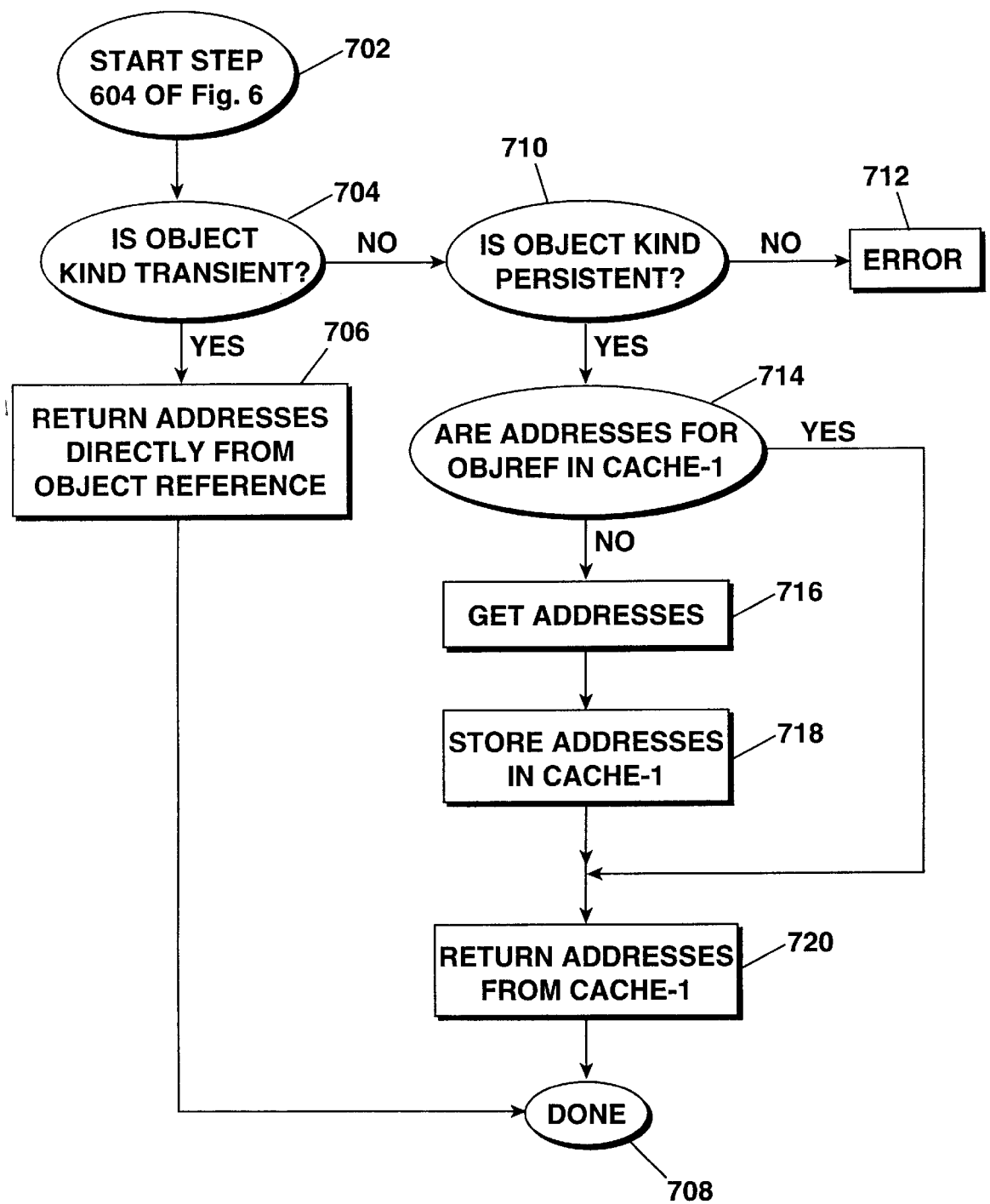
FIG. 7 is a flow chart illustrating in further detail a step 604 of FIG. 6.

Referring now to FIG. 7, a more detailed description of step 604 in accordance with one method aspect of the present invention will be described. As will be appreciated by those of skill in the art, the method of FIG. 7 is generally for use in a distributed object system utilizing the object references of FIG. 5a and 5b or similar object references. However, as will be apparent, the scope of the present invention includes other embodiments of step 604 which are more suitable for additional embodiments of object references.

The flow chart of FIG. 7 begins in a step 702 when control is passed to step 604 of FIG. 6. The initial substantive step of FIG. 7, step 704, determines if the object kind is transient. As discussed above in reference to FIGS. 5a and 5b, the object kind determination can be accomplished by various methods such as examining the internal name. In the case where the object kind is transient, control branches to a step 706 where the addressing information is returned directly from the object reference. This is possible because a transient object reference in accordance with FIG. 5a has direct addressing information, as opposed to an indirection. Once the addressing information is returned in step 706, control is passed to a step 708 where the acquire addressing information step 604 is complete.

Following down the other branch of step 704, if the object kind is not transient, control is passed to a step 710, where it is determined if the object kind is persistent. If the object kind is not persistent (the object is null or invalid), control is passed to a step 712 wherein an error message is generated and step 604 is complete. As should be apparent, if the object is neither transient nor persistent, it is improper to send a request to the target object (as it is either null or invalid) and thus an error message is appropriate.

On the other hand, if in step 710 it is determined that the object kind is persistent, then in a step 714 a memory cache-1 is checked to see if the target object addressing information is resident therein. If so, control proceeds to a step 720 where the addressing information is returned directly from cache-1 and then on to step 708 where step 604

(which acquired addressing information) is complete. The cache memory may be any suitable memory such as local RAM 38 described in reference to FIG. 2. Storing and retrieving the addressing information in memory cache-1 allows for direct and speedy access to this information.

If the addressing information is not resident in cache-1, control proceeds to a step 716 were the client obtains the addressing information. Typically the addressing information is obtained in step 716 by means of an indirection utilizing a locator service as described previously with reference to FIGS. 5a and 5b. One embodiment of step 716 will be described in more detail below with respect to FIG. 9. After the addressing information is obtained in step 716 it is stored in cache-1 in a step 718, thereby perpetuating the efficiency of this method. Additionally, another mechanism for increasing the addressing information available in cache-1 will be described below in reference to FIG. 11. Then, in a step 720, the addressing information is returned from cache-1 and control is passed to a step 708 where the acquire addressing information step 604 is complete.

One embodiment of the choose address step 606 of FIG. 6 will now be described in further detail with respect to FIG. 8. This embodiment serves primarily to select the addressing information which will provide the fastest mode of transport between the client and the server. The three different modes of transport described herein are (in descending order of transport speed) local, shared memory, and remote transport. Local transport occurs within the same process and is performed by copying data within the same address space. Shared memory transport (may also be called "same host") is performed using the host operating system inter-process communication procedures. Remote transport is performed using networking facilities. Each of these may vary depending upon factors such as the operating system and the network communication protocol. The design and implementation of local, shared, and remote transport will be familiar to those skilled in the art.

Figure 8:
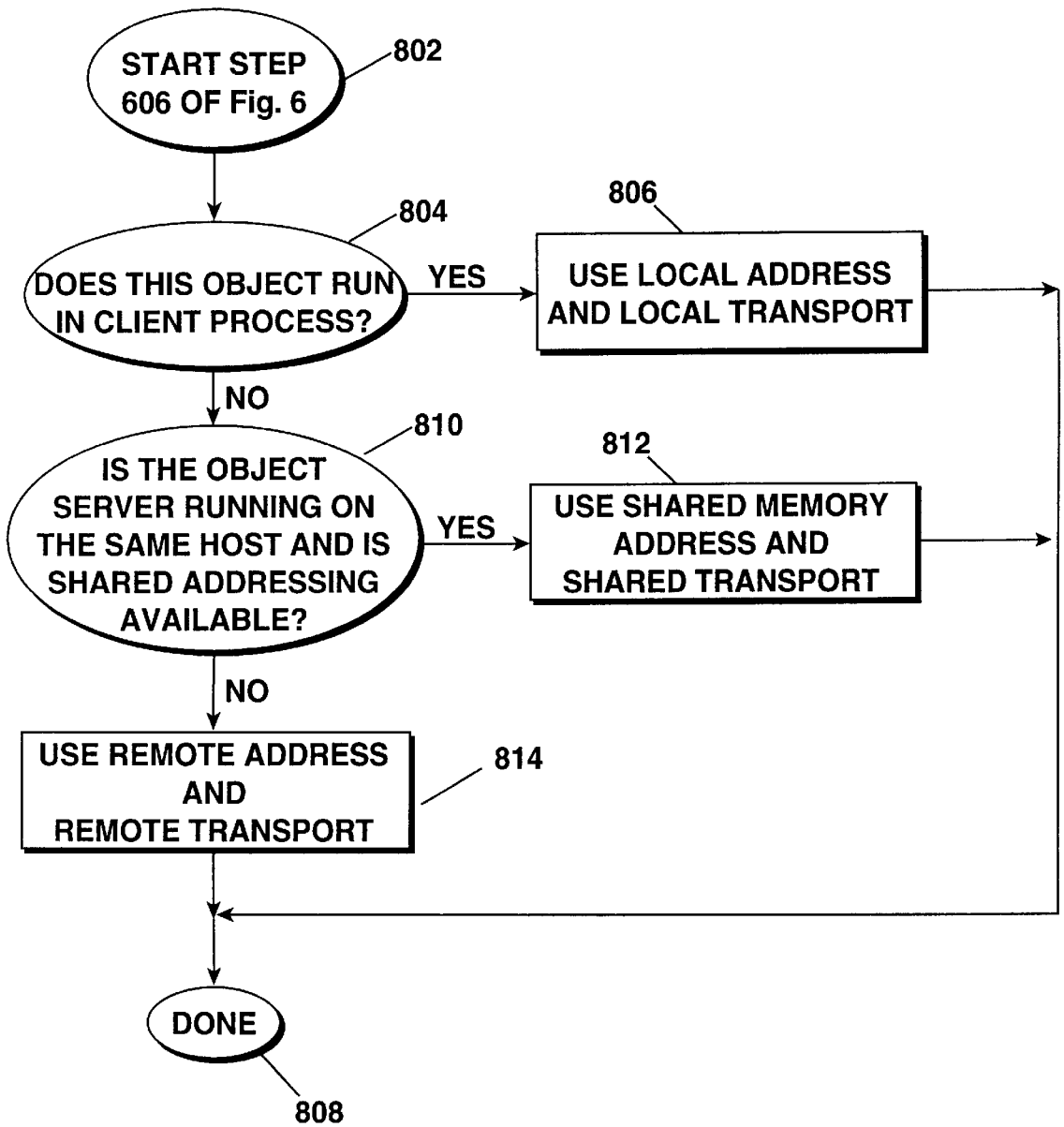
FIG. 8 is a flow chart illustrating in further detail a step 606 of FIG. 6.

The flow chart of FIG. 8 begins in a step 802 when control is passed to step 606 of FIG. 6. Then, in a step 804, it is determined if the target object is running in the client process. If so, then in a step 806 the local address and local transport are selected to connect the client and server. On the other hand, if the target object does not run in the client process, then in a step 810 it is determined if the server object is running on the same host as the client and if shared memory addressing information is available. If so, then in a step 812 shared memory addressing and shared memory transport are selected to connect the client and server. Otherwise, if the target object is resident neither in the client process nor in the client host, a step 814 selects the remote address and remote transport to connect the client and server. In any event, after the addressing has been selected, control is passed to a step 808 wherein step 606 of FIG. 6 is complete.

Figure 9:
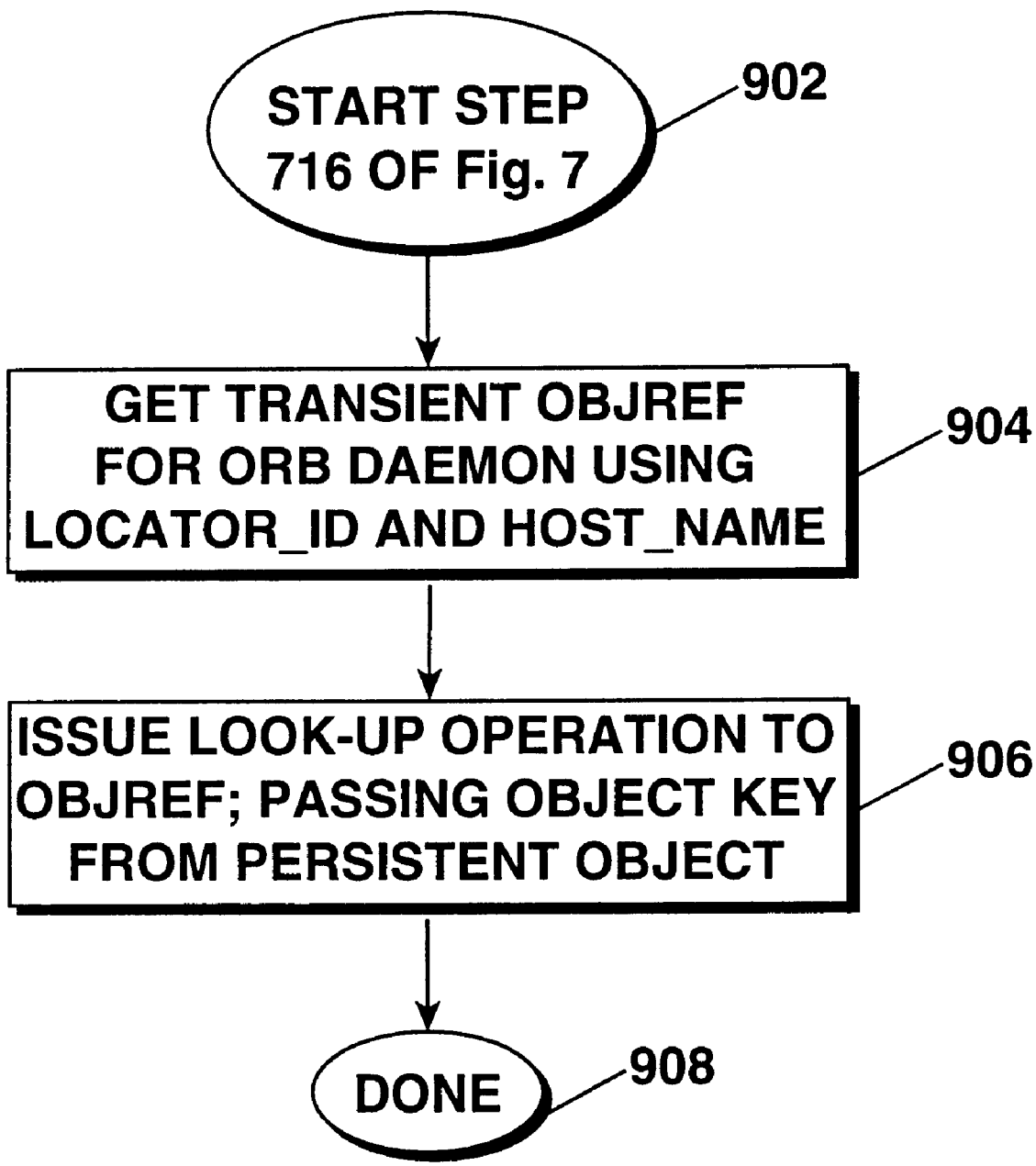
FIG. 9 is a flow chart illustrating in further detail a step 716 of FIG. 7.

Referring next to FIG. 9, one embodiment of step 716 of FIG. 7 is described in more detail. The method of FIG. 9 begins in a step 902 when the get addressing step 716 receives control. Next, in a step 904, the transient object reference for an ORB daemon process is obtained by way of the locator id and the host name. In one embodiment, an ORB daemon process is resident on each computer system of the distributed object environment. The ORB daemon specifically found in step 904 is a process running in the background on the server host computer, under which a locator object is active. Daemon processes are well know to those of skill in the art. Next in a step 906 the client calls the locator object to invoke a look-up method, passing arguments including the object key for the target object. In response, the ORB daemon will return direct addressing information for the target object. In preferred embodiments the daemon process will additionally verify the state of the server process, starting the process if necessary. One preferred embodiment of server process startup can be found in Vanderbilt et. al.'s copending U.S. patent application Ser. No. (Attorney Docket No. P747/SUN1P030) entitled "METHODS AND APPARATUS FOR MANAGING COMPUTER PROCESSES", which is incorporated herein by reference in its entirety. After the direct addressing information is received, control is passed to a step 908 wherein step 716 of FIG. 7 is complete.

Figure 10:
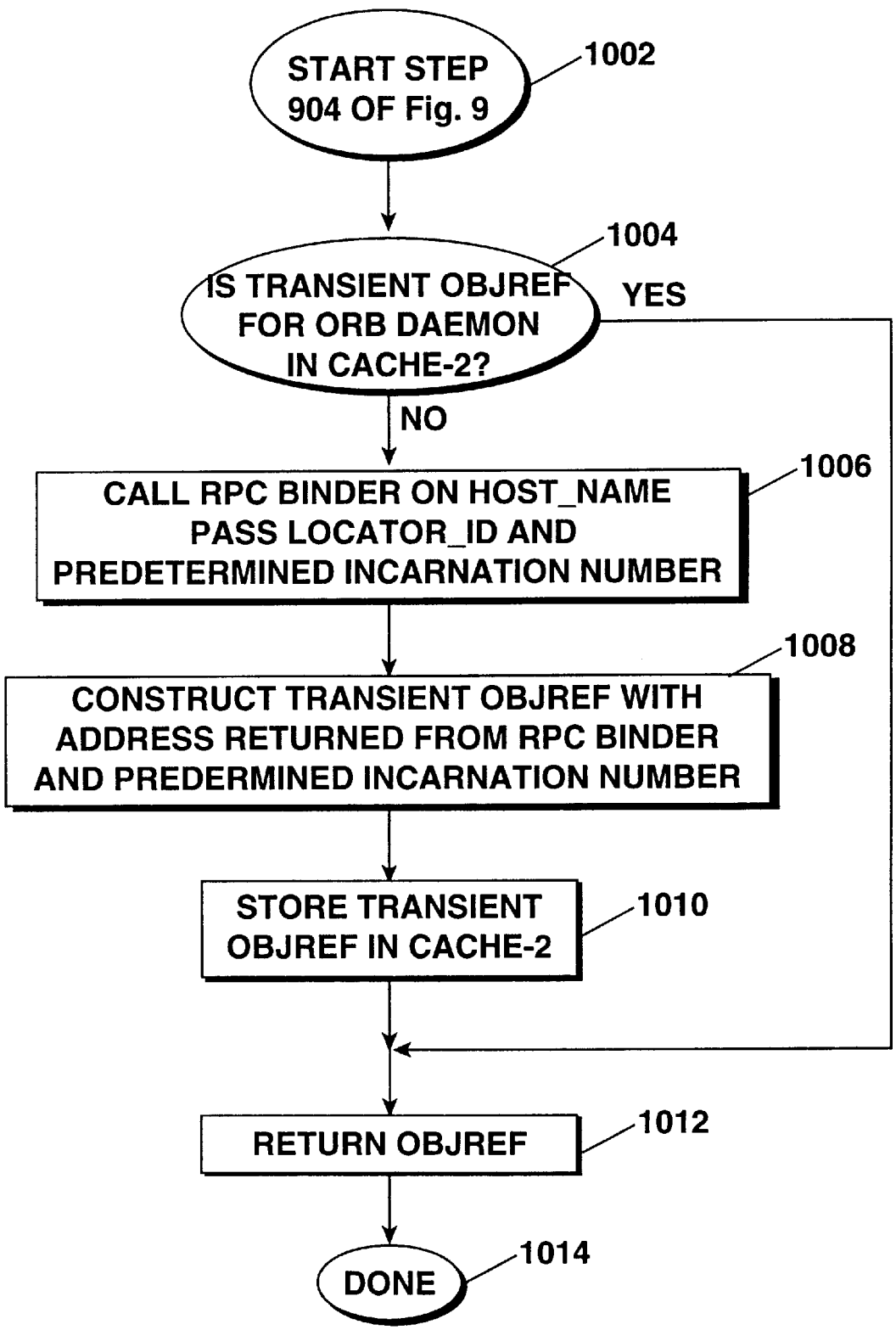
FIG. 10 is a flow chart illustrating in further detail a step 904 of FIG. 9.

Turning next to FIG. 10, one embodiment of step 904 of FIG. 9 is described in more detail. The method of FIG. 10 begins in a step 1002 when the get transient object reference for ORB daemon step 904 receives control. In a step 1004, it is determined if the transient object reference for the ORB daemon is resident in a memory cache-2. If so, control branches to a step 1012 where the transient object reference for the ORB daemon is returned directly from cache-2. After the transient object reference is returned, control is passed to a step 1014 wherein step 904 of FIG. 9 is complete.

If the transient object reference for the ORB daemon is not resident in cache-2, the control branches to a step 1006, wherein the client calls the remote procedure call (RPC) binder on the server host, passing the locator id and the incarnation number as arguments to the call. In response, the RPC binder returns addressing information and in a step 1008, the client constructs the transient object reference utilizing the returned ORB daemon addressing information. Implementation and construction of the RPC binder are well known to those skilled in the art. Once the transient object reference has been constructed, the client stores it in cache-2 in a step 1010, thereby perpetuating the efficiency of this method. Then control is passed to a step 1012 where the transient object reference for the ORB daemon is returned directly from cache-2. After the transient object reference is returned, control is passed to a step 1014 wherein step 904 of FIG. 9 is complete.

One method for increasing the addressing information available in cache-1 will be described now with reference to FIG. 11. By way of background, an object reference for a persistent object may have an optional location hint (as described in reference to FIG. 5b and elsewhere). The location hint includes direct addressing information for a target object. Thus each location hint has the addressing information step 714 of FIG. 7 is looking for in cache-1. Furthermore, as will be appreciated by those skilled in the art, object references may be received by a host computer either through an object call or in response to an object call. Thus there is the potential to increase the addressing information every time an object reference is received.

Figure 11:
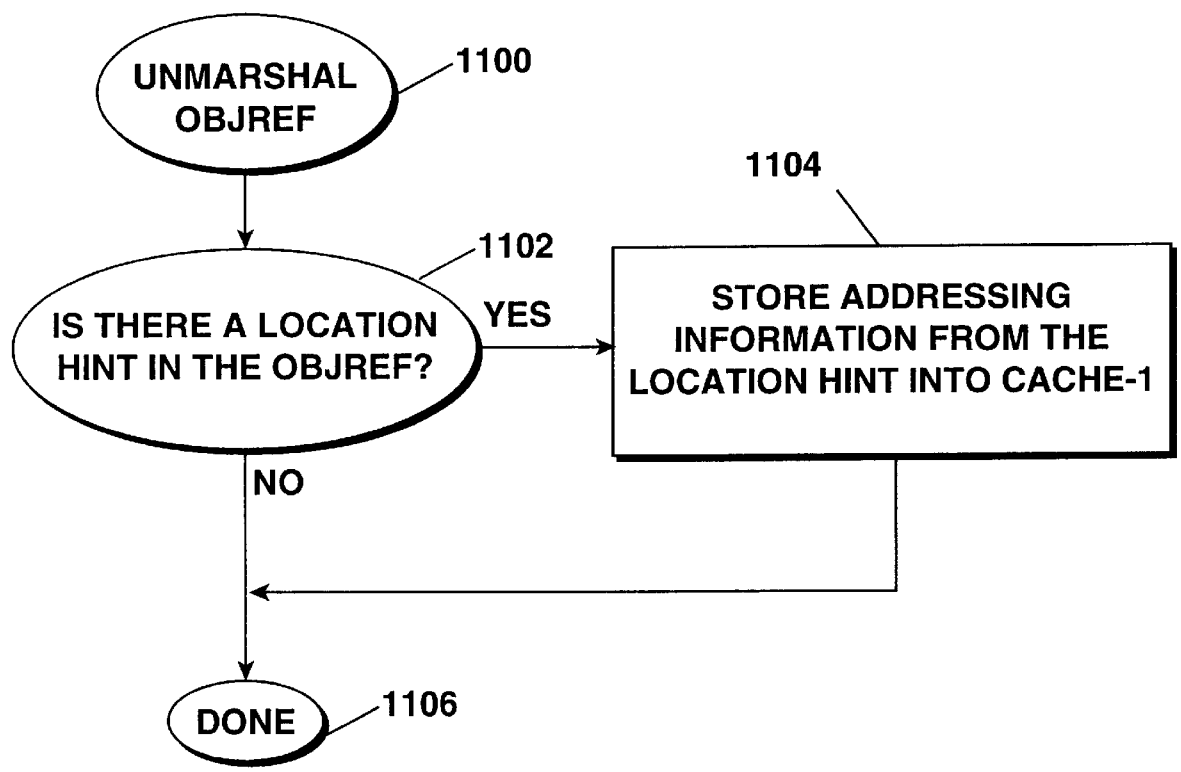
FIG. 11 is a flow chart illustrating a process for perpetuating the advantages of the present invention by increasing the addressing information available in cache memory.

In the method of FIG. 11, a first step 1100 unmarshals an object reference which has been received for any reason such as the two mentioned in the preceding paragraph. Then, in a step 1102, it is determined if the object reference has a location hint. If so, in a step 1104, the addressing information and an expiration date (if present) from the location hint is stored into cache-1. If there is no location hint, or subsequent to updating the cache-1, the method of FIG. 11 is done in a step 1106 and the object reference can be used for its originally intended purpose.

In another method aspect of the present invention, one closely related to the method of FIG. 11, the separate computers of the distributed object operating environment work together to share addressing information. Therefore, when one computer uses a locator service to obtain addressing information about a target object, this computer may in turn distribute this information along to the other computers of the distributed object operating environment. One suitable way to pass this information would be by way of an object reference. Then each computer would store this addressing information along with an expiration date into its cache-1 memory.

One further advantage of the present invention can now be discussed. As will be appreciated by those of skill in the art, one model (useful for the present discussion) divides the ORB into three different abstract levels, defined herein as the Application Level ORB, the Transport Level ORB, and the Communication Level ORB. Components representative of the lower Communication Level ORB would include the activities of the shared, local, and remote addressing and transport discussed above with respect to FIG. 8. Components representative of the upper Application Level ORB would include the initial client call to a server, wherein the location and object kind of the server was opaque to the client. The middle level, the Transport Level ORB, is the only portion of the ORB which must to be concerned with the kind of the server object. Thus the present invention accomplishes the task of integrating transient and persistent objects within a distributed object environment without introducing an undue burden throughout the ORB, thereby ensuring the efficiency of the distributed object environment.

Although only a few embodiments of the present invention have been described, it should be understood that the present invention may be embodied in many other specific forms without departing from the spirit or scope of the invention. The client-server models discussed with reference to FIGS. 3a-3b are only samples and in no way should be construed as limiting. By way of example, the "host-to-host" model could be extrapolated to include multiple target objects. That is, the first target object 304 could simply be an object reference which indirects to another target object, perhaps in another distributed object environment. Or, the first target object could perform a portion of the requested service and then make its own call to a second target object before responding to the first client 302. As will be appreciated, the possible enumerations take on many embodiments, all of which fall within the scope of the present invention.

Still further, the data structures of FIG. 5a and 5b may be varied greatly and yet fall within the scope of the present invention. As a first example, data structures for both transient and persistent object references could be embodied without the kind field. Still further examples can be found by contemplating the multiplicity of network communication protocols, operating systems, and applications programs. Each of these may require a specific arrangement of the described data structures. Construction and implementation of each of these numerous embodiments will be apparent to those skilled in the art and, accordingly, fall within the scope of the present invention.

As will be appreciated by those skilled in the art of distributed object systems, the underlying ideas behind the described methods of handling transient and persistent objects can be implemented in a wide variety of alternative embodiments, of which there far too many to discuss in detail. However, since the underlying philosophy has been described, various alternatives will be obvious to those skilled in the art. By way of example, the method of selecting a transport mode, one embodiment which was described with respect to FIG. 8, may have many variations. The selection criterion could emphasize a load sharing desire, thus a remote address may be the best address under this criterion. From another aspect, there may be different forms of transport not described. However, if other forms of transport are available, those of skill in the art will understand how to apply the teaching of the present invention to utilize these other modes of transport.

Therefore, the present examples are to be considered as illustrative and not restrictive, and the invention is not to be limited to the details given herein, but may be modified within the scope of the appended claims.

We claim:

1. An object for use as an object reference for a distributed object associated with a server computer process executing on a server computer system in a distributed object operating environment said distributed object having a data structure comprising:

an object interface and a data portion including:
  a kind field configured to identify the distributed object as either a persistent distributed object or a transient distributed object; and
  an object key corresponding to said distributed object, said object key being configured to identify said distributed object;
wherein:
  if said kind field identifies said distributed object to be a transient distributed object, then said data portion icludes transient distributed object identification fields including:
    (1) a set of endpoint addresses corresponding to said server computer system, said set of endpoint addresses including a network address of said server computer system and a specific process identifier assigned by said server computer system to said server computer process; and
    (2) an incarnation number corresponding to said server computer process, said incarnation number suitable to distinguish said server computer process from other server computer processes that may have been assigned said specific process identifier by said server computer system; and
  if said kind field identifies said distributed object to be a persistent distributed object, then said data portion includes persistent distributed object identification fields including:
    (1) a computer system name corresponding to a computer system on which a locator service exists, said locator service being operable to provide addressing information regarding said persistent distributed object;
    (2) a locator identifier corresponding to a daemon computer process under which said locator service resides, said daemon computer process being resident on said computer system; and
    (3) a subobject identifier suitable for use in identifying a subobject present in said persistent distributed object;
such that said kind field, said object key, and said transient and persistent object identification fields uniquely identify and locate said distributed object.

2. An object as described in claim 1 wherein said kind field indicates that said object kind is transient.

3. An object as described in claim 2 wherein said set of endpoint addresses is a data element of variable length.

4. An object as described in claim 2 wherein said set of endpoint addresses is a data element of fixed length.

5. An object as described in 4 wherein one address of said set of endpoint addresses is a data element in the range of 24–128 bytes long.

6. An object as described in claim 5 wherein 4 bytes of said one address is a server computer system network address and 2 bytes of said one address is a server computer process network port number.

7. An object as described in claim 2 wherein said set of endpoint addresses includes a server computer system network address and a server computer process network port number.

8. An object as described in claim 2 wherein the distributed object operating environment includes a client resident in a client computer process executing on a client computer system and said set of endpoint addresses and said incarnation number together indicate that said server computer process is said client computer process.

9. An object as described in claim 2 wherein the distributed object operating environment includes a client resident in a client computer process executing on a client computer system and said set of endpoint addresses and said incarnation number together indicate that said server computer system is said client computer system.

10. An object as described in claim 2 wherein said incarnation number is a data element of variable length.

11. An object as described in claim 10 wherein said incarnation number is a data element of fixed length.

12. An object as described in claim 11 wherein said incarnation number is a data element in the range of 1–16 bytes long.

13. An object as described in claim 2 wherein said incarnation number is a number indicating the creation time of said server computer process.

14. An object as described in claim 2 wherein said incarnation number is a predefined number which has a predefined meaning to the server computer process.

15. An object as described in claim 2 wherein said object key is an identifier which in conjunction with said set of addressing information and said incarnation number uniquely defines said transient server object.

16. An object as described in claim 15 wherein said object key is a identification number unique within said server computer process.

17. An object as described in claim 2 wherein said distributed object operating environment is a first distributed object operating environment, and wherein said object key includes a second object for use as a second object reference for a transient object of a second distributed object operating environment.

18. An object as described in claim 17 wherein said object key enables a client in said first distributed object operating environment to call said transient object of said second distributed object operating environment.

19. A transient server object corresponding to an object reference as described in claim 2, said transient server object having transient state associated with it, said transient state stored in transient memory on said server computer system.

20. A transient server object as recited in claim 19 wherein said transient server object is bound directly to said server computer process such that when said server computer process ceases, said transient server object ceases to exist.

21. A distributed object operating environment comprising:
  a plurality of computer systems;
  a computer network interconnecting said plurality of computer systems; and
  at least one object as recited in claim 1, said at least one object residing on one of said plurality of computer systems.

22. An object as described in claim 1, wherein said kind field indicates that said object kind is persistent.

23. An object as described in claim 22 wherein said data structure of said second object further includes a location hint.

24. An object as described in claim 23 wherein said location hint includes:
  a set of endpoint addresses corresponding to said second server computer system upon which said persistent server object resides; and
  an incarnation number corresponding to said second server computer process,
  such that said set of endpoint addresses, said incarnation number, and said object key uniquely identify and locate said persistent server object.

25. An object as described in claim 22 wherein said computer system on which a locator service exists is a server computer system.

26. A distributed object operating environment comprising:
  a plurality of computer systems;
  a computer network interconnecting said plurality of computer systems; and
  at least one object as recited in claim 1, said at least one object residing on one of said plurality of computer systems.

* * * * *

UNITED STATES PATENT AND TRADEMARK OFFICE
CERTIFICATE OF CORRECTION

PATENT NO. : 6,009,266  
DATED : December 28, 1999  
INVENTOR(S) : David M. Brownell and Pavani Diwanji Page 1 of 1

It is certified that error appears in the above-identified patent and that said Letters Patent is hereby corrected as shown below:

Claim 1,  
Line 16, (column 20, line 28), change "icludes" to -- includes --.

Signed and Sealed this

Eleventh Day of September, 2001

Attest:

*Nicholas P. Godici*

NICHOLAS P. GODICI  
*Attesting Officer*  *Acting Director of the United States Patent and Trademark Office*